US010193619B2

United States Patent
Ferreira et al.

(10) Patent No.: US 10,193,619 B2
(45) Date of Patent: Jan. 29, 2019

(54) MODE DIVISION MULTIPLEXED PASSIVE OPTICAL NETWORK

(71) Applicant: ASTON UNIVERSITY, Birmingham, West Midlands (GB)

(72) Inventors: Filipe Ferreira, Birmingham (GB); Andrew Ellis, Birmingham (GB); Naoise Mac-Suibhne, Birmingham (GB); Christian Sanchez-Costa, Birmingham (GB)

(*) Notice: Subject to any disclaimer, the term of this patent is extended or adjusted under 35 U.S.C. 154(b) by 0 days.

(21) Appl. No.: 15/762,386

(22) PCT Filed: Sep. 22, 2016

(86) PCT No.: PCT/EP2016/072526
§ 371 (c)(1),
(2) Date: Mar. 22, 2018

(87) PCT Pub. No.: WO2017/050886
PCT Pub. Date: Mar. 30, 2017

(65) Prior Publication Data
US 2018/0302154 A1    Oct. 18, 2018

(30) Foreign Application Priority Data
Sep. 22, 2015    (GB) .................................. 1516759.9

(51) Int. Cl.
*H04J 14/04* (2006.01)
*H04B 10/077* (2013.01)
*H04Q 11/00* (2006.01)

(52) U.S. Cl.
CPC .......... *H04B 10/0775* (2013.01); *H04J 14/04* (2013.01); *H04Q 11/0067* (2013.01)

(58) Field of Classification Search
CPC ...................................................... H04J 14/04
See application file for complete search history.

(56) References Cited

U.S. PATENT DOCUMENTS

| | | |
|---|---|---|
| 2014/0161439 A1 | 6/2014 | Nolan |
| 2015/0104168 A1 | 4/2015 | Djordjevic |
| 2017/0302399 A1* | 10/2017 | Yin ........................ H04W 40/24 |

FOREIGN PATENT DOCUMENTS

| | | |
|---|---|---|
| DE | 102007015225 A1 | 10/2008 |
| EP | 1742388 A1 | 1/2007 |

(Continued)

OTHER PUBLICATIONS

Wu Guofeng; 'Methods of increasing the bandwidth-distance product for multimode fibers in LAN', Journal of Optical Communications, Fachverlag Schiele & Schon. Berlin. DE, vol. 29. Jan. 1, 2008 (Jan. 1, 2008), pp. 213-216. XP009138148, ISSN: 0173-4911. (Year: 2008).*

(Continued)

*Primary Examiner* — Nathan M Cors
(74) *Attorney, Agent, or Firm* — Troutman Sanders LLP

(57) ABSTRACT

A method of compensating for crosstalk in a mode division multiplexing passive optical network using a technique of transmitter-side crosstalk pre-compensation, performed at the Central Office, in which a downlink reference signal such as a training sequence or pilot signal is retrieved at the transmitter without being influenced by crosstalk effects on its uplink transmission. An uplink reference signal is transmitted in a quasi-single mode transmission along the optical fiber, and a plurality of optical signals input to transmission multiplexer are adapted based on the uplink reference signal to pre-compensate for crosstalk.

9 Claims, 7 Drawing Sheets

(56) References Cited

FOREIGN PATENT DOCUMENTS

| EP | 2521289 | A1 | | 5/2011 | |
|----|---------|----|---|--------|---|
| EP | 2453600 | A1 | | 5/2012 | |
| EP | 2521289 | A1 | * | 7/2012 | ............. H04B 10/13 |

OTHER PUBLICATIONS

Search Report dated Jan. 18, 2016 during the prosecution of GB Patent Application No. 1516759.6.
International Search Report dated Nov. 29, 2016 during the prosecution of International Patent Application No. PCT/EP2016/072526.
Wu Guofeng: 'Methods of increasing the bandwidth-distance product for multimode fibers in LAN', Journal of Optical Communications, Fachverlag Schiele & Schon. Berlin. DE, vol. 29. Jan. 1, 2008 (Jan. 1, 2008), pp. 213-216. XP009138148, ISSN: 0173-4911.

\* cited by examiner

MODE DIVISION MULTIPLEXED PASSIVE OPTICAL NETWORK

CROSS REFERENCE TO RELATED APPLICATIONS

This is a U.S. National Phase Application under 35 U.S.C. § 371 of International Patent Application No. PCT/EP2016/072526, filed Sep. 22, 2016, and claims benefit of priority to GB Application No. 1516759.9, filed Sep. 22, 2015. The entireties of all above applications are incorporated herein by reference.

FIELD OF THE INVENTION

The invention relates to a passive optical network. In particular, the invention relates to a mode division multiplexed passive optical network in which a few mode fibre (FMF) is used to convey optical signals that are selectively delivered to a plurality of end users.

BACKGROUND

Mode division multiplexing (MDM) technology is a potential next-generation solution to improve the capacity of optical access networks in a cost-effective way and to provide backward compatibility with legacy standard single-mode fibre optic networks. In theory, an N-fold capacity increase can be obtained by using a few-mode fibre (FMF) to guide N independent modes. However, there are two effects seen in FMFs which impair the signal and need to be addressed in order to reach full capacity. These effects are (i) linear modal coupling (crosstalk), and (ii) differential mode delay. On long distance applications, the interplay between these effects typically requires the use of a coherent receiver in order to enable their mitigation through digital signal processing (DSP).

The basic architecture 100 of a known MDM passive optical network (PON) for supporting 6 modes (LP01, LP11a, LP11b, LP21a, LP21b, LP02) is shown in FIG. 1. At an input (transmitter) side there are six optical line terminations (OLTs) 102, which are located in the same facility (often referred to as a Central Office (CO)). At an output (receiver) side, there are six optical network units (ONUs) 104, which are typically distributed in different physical locations.

Each OLT is connected to a transmitter side mode multiplexer 108 by a respective single mode fibre (SMF) 106. The mode multiplexer combines the signals from the OLTs 102 and transmits them on a few mode fibre (FMF) 110. At the receiver side, a mode demultiplexer 112 extracts each relevant signal and outputs to each respective ONU 104 via a respective single mode fibre 114.

The system in FIG. 1 introduces new impairments to the transmitted signal that are not encountered in single mode fibre passive optical networks, namely:
- the mode multiplexer 108 and mode demultiplexer 112 can introduce a non-negligible amount of crosstalk;
- the FMF 110 can introduce different differential mode delay and different crosstalk levels between different pairs of linearly polarized (LP) modes.

For pairs of non-degenerate LP modes, such as LP01 and LP11a or LP01 and LP11b, the crosstalk strength can be as low as −40 dB/km (e.g. −27 dB at the end of 20 km), but the differential mode delay can be as high as 1000 ps/km. In contrast, for pairs of degenerate LP modes, for example LP11a and LP11b or LP21a and LP21b, the crosstalk strength is much higher such that full mixing can be achieved after a couple of tens of kilometres but the differential mode delay can be lower than 1 ps/km.

The different effects for degenerate and non-degenerate modes can be understood by considering the transfer matrix for the FMF 110. A FMF can be modelled as N sections, where each section is modelled by one unitary matrix XT introducing the crosstalk and one diagonal matrix DMD whose diagonal elements introduce the mode delay. FIG. 2 shows an example of these matrices for the ith section of an FMF.

In general, the fibre matrix $H_{FMF}(\omega)=XT_1DMD_1 \ldots XT_NDMD_N$ is dependent on the frequency whenever the differential mode delay is non-negligible. Since this is the case in general for pairs of non-degenerate LP modes, the full fibre matrix is dependent on frequency.

In known MDM techniques, channel estimation/inversion is usually done in the electrical domain after detecting the modes all together. However, in the architecture described in FIG. 1, the modes are detected independently, which means it is impractical or impossible to use a DSP at the receiver end, e.g. because it would require replacement of an already-installed SMF between the mode DEMUX and the customer premises and installation of separate DSP-capable ONUs at each customer premises. For these reasons, it is desirable for channel estimation/inversion to be done at the transmitter end if this detection technique is to be used.

Channel estimation at the CO requires the communication/cooperation between OLTs (enabled by the backplane) and the downstream transmission of training sequences or pilot signals (which must be different for each mode), which have to be retrieved by the transmitter somehow. In this way, different OLTs will receive different combinations of the training sequences or pilot signals, which when combined allow for the estimation of the channel matrix and consequent pre-compensation. However, a disadvantage of this arrangement is that the training sequences/pilot signals will experience crosstalk on the upstream transmission during retrieval by the transmitter. In this scenario, it becomes very difficult to estimate the downstream fibre matrix.

SUMMARY

At its most general, the present invention provides a technique of transmitter-side crosstalk pre-compensation, e.g. performed at the Central Office (CO), in which a downlink reference signal such as a training sequence or pilot signal is retrieved at the transmitter (CO) without being influenced by crosstalk effects on its uplink transmission.

According to one aspect of the invention, there is provided a mode division multiplexing passive optical network comprising: a plurality of input channels, each of the plurality of input channels being arranged to convey an input optical signal in a different one of a plurality of modes; an optical transfer unit comprising: a multiplexer having a plurality of input ports and an output port, wherein each of the plurality of input ports is connected to a respective one of the plurality of input channels; an optical fibre having an uplink end connected to the output port, wherein the optical fibre is arranged to receive from the multiplexer a mode multiplexed signal corresponding to the input optical signals from the plurality of input channels; and a demultiplexer having an input port and a plurality of output ports, wherein the input port is connected to a downlink end of the optical fibre, and wherein the demultiplexer is arranged to divide the mode multiplexed signal between each of the plurality of output ports; and a plurality of output channels, each of the plurality of output channels being connected to a respective one of the plurality of output ports and being arranged to convey an output optical signal in a different one of the plurality of modes conveyed by the plurality of input channels, wherein the optical transfer unit is arranged to: transmit a plurality of downlink reference signals in the mode multiplexed signal, each of the plurality of downlink reference signals being in a different one of the plurality of modes, receive the plurality of downlink reference signals at the plurality of output ports, couple the received plurality of downlink reference signals into an uplink reference signal, transmit the uplink reference signal in a quasi-single mode transmission along the optical fibre, and receive the uplink reference signal at the uplink end of the optical fibre; and wherein the passive optical network further comprises a downlink signal pre-compensation module arranged to adapt the optical signals on two or more of the plurality of input channels to pre-compensate for crosstalk in the optical transfer unit, and wherein the downlink signal pre-compensation module is controllable based on the received uplink reference signal. The quasi-single mode transmission can ensure that crosstalk effects do not influence the uplink reference signal, e.g. because the mode selected for that single does not experience strong crosstalk effects. For example, a non-degenerate mode of the optical fibre is preferred for the quasi-single mode transmission.

In another aspect, the invention provides a method of compensating for crosstalk in a mode division multiplexing passive optical network, the method comprising: inputting a plurality of downlink reference signals to a multiplexer, each of the plurality of downlink reference signals being in a different one of a plurality of modes; transmitting the plurality of downlink reference signals as a mode multiplexed signal along an optical fibre; receiving the mode multiplexed signal at a demultiplexer; outputting a plurality of received downlink reference signals from the demultiplexer, each of the received plurality of downlink reference signals being in a different one of a plurality of modes; coupling the received plurality of downlink reference signals into an uplink reference signal, transmitting the uplink reference signal in a quasi-single mode transmission along the optical fibre, adapting a plurality of optical signals input to the multiplexer based on the uplink reference signal to pre-compensate for crosstalk.

The optical fibre may be a few mode fibre (FMF) capable of supporting propagation in a plurality of degenerate and non-generate modes. The uplink reference signal may be transmitted using one or more of the non-degenerate modes.

In one embodiment, the multiplexer (and preferably the demultiplexer) may be mode-selective, i.e. optimised to reduce the crosstalk between non-degenerate modes to less than −20 dB. Such a mode-selective multiplexer may be designed using appropriate phase masks. In this embodiment, crosstalk occurs mainly between degenerate modes, which simplifies the crosstalk characteristic matrix of the system. In this scenario, the downlink reference signals may be pilot tones, and the downlink pre-compensation module can be implemented using electrical butterfly FIR filters to apply suitable pre-distortion.

In another embodiment, the multiplexer (and demultiplexer) may not have the mode-selective capability. This can mean that non-negligible crosstalk occurs between all pairs of modes, non-degenerate and degenerate. In this case, more complex field detection techniques are required for the channel estimation. For example, the downlink reference signals may be training sequences. Retrieval of these training sequence may allow the full crosstalk characteristic matrix of the system to be estimated in order for an electrical inversion signal to be calculated for one or more or all of the plurality of input channels (e.g. by a digital signal processor) at the transmitter (CO).

Further optional features and preferences are set out in the claims.

BRIEF DESCRIPTION OF THE DRAWINGS

Examples of the inventions are discussed below with reference to the accompanying drawings, in which.

DETAILED DESCRIPTION

The present invention is based on the recognition that, in typical FMFs, the differential mode delay between degenerate modes is usually very low (~1 ps/km). This means that matrix terms of $XT_i$ relating these modes (e.g. relating LP11$a$ and LP11$b$ or LP21$a$ and LP21$b$) have a low dependency on the frequency. These terms are primarily responsible for the introduction of crosstalk as explained above.

Figure 1:
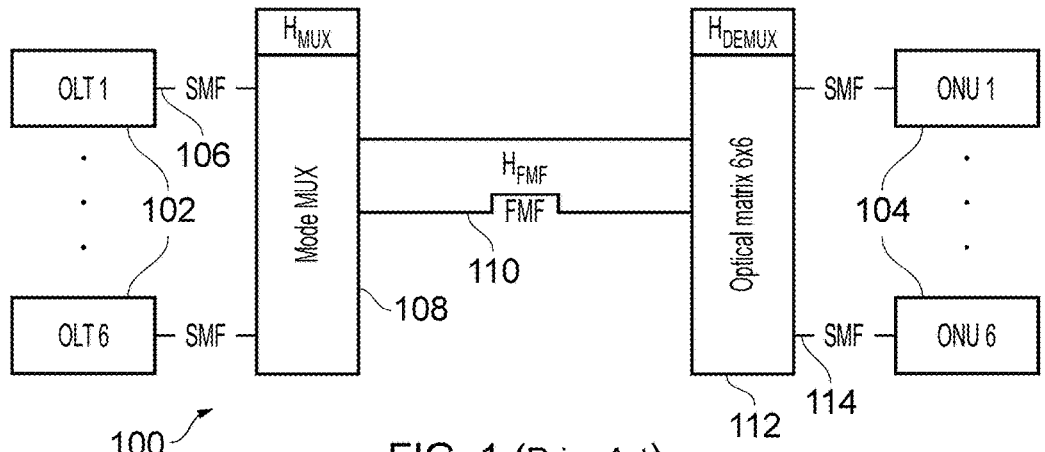
FIG. 1 is a schematic diagram of a known architecture for a mode division multiplexing passive optical network (MDM-PON), which is discussed above.

The crosstalk characteristics of the mode multiplexer 108 and mode demultiplexer 112 shown in FIG. 1 can be described by a respective unitary matrices (e.g. $H_{MUX}$ and $H_{DEMUX}$). After inversion, these matrices can be used to fully compensate for the mode mixing. However, by appropriate design of the mode multiplexer 108 and mode demultiplexer 112 known to a skilled person, the crosstalk introduced between non-degenerate LP modes can be reduced to less than −20 dB, which means it can be treated as negligible for the purposes of the invention. In this case, only the crosstalk between degenerate LP modes needs to be compensated.

Figure 2:
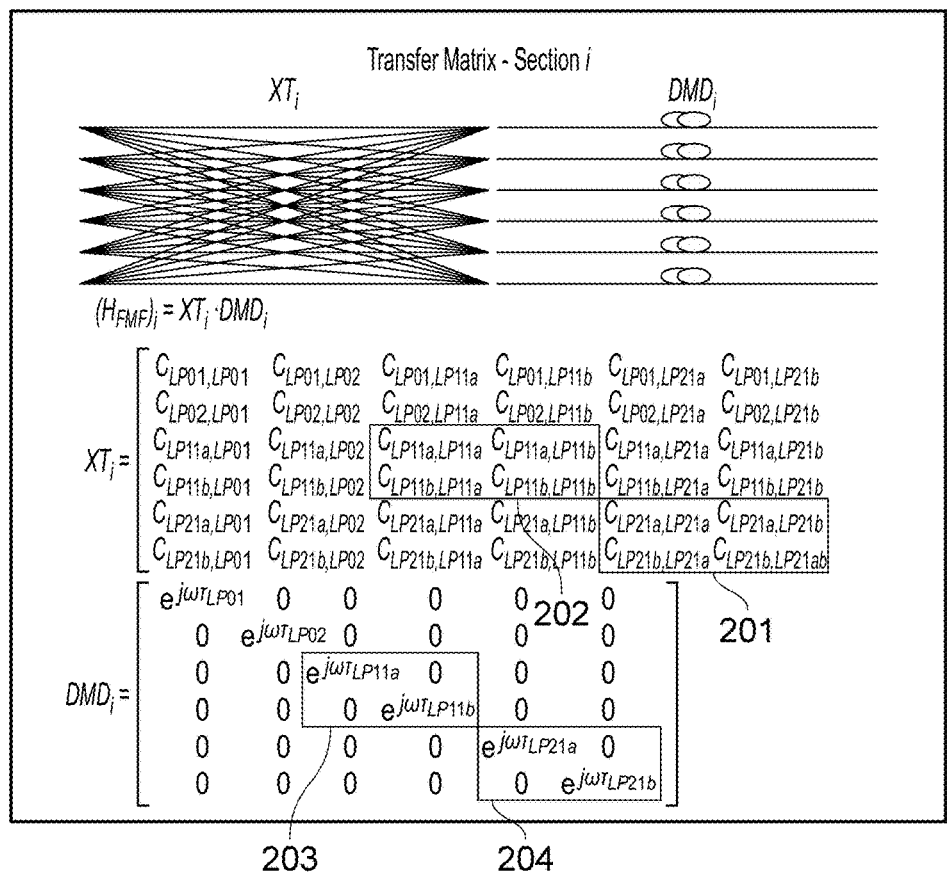
FIG. 2 is an illustration of section I of a fibre model transfer matrix, also discussed above.

In this invention, we propose the mitigation of the crosstalk introduced along the FMF either by using mode selective MUX/DEMUX and mitigating only the crosstalk taking place between degenerate modes, i.e. the terms highlighted in boxes 201, 202, 203, 204 in FIG. 2, or by using mode non-selective MUX/DEMUX and mitigating the crosstalk between the full set of modes.

Figure 3:
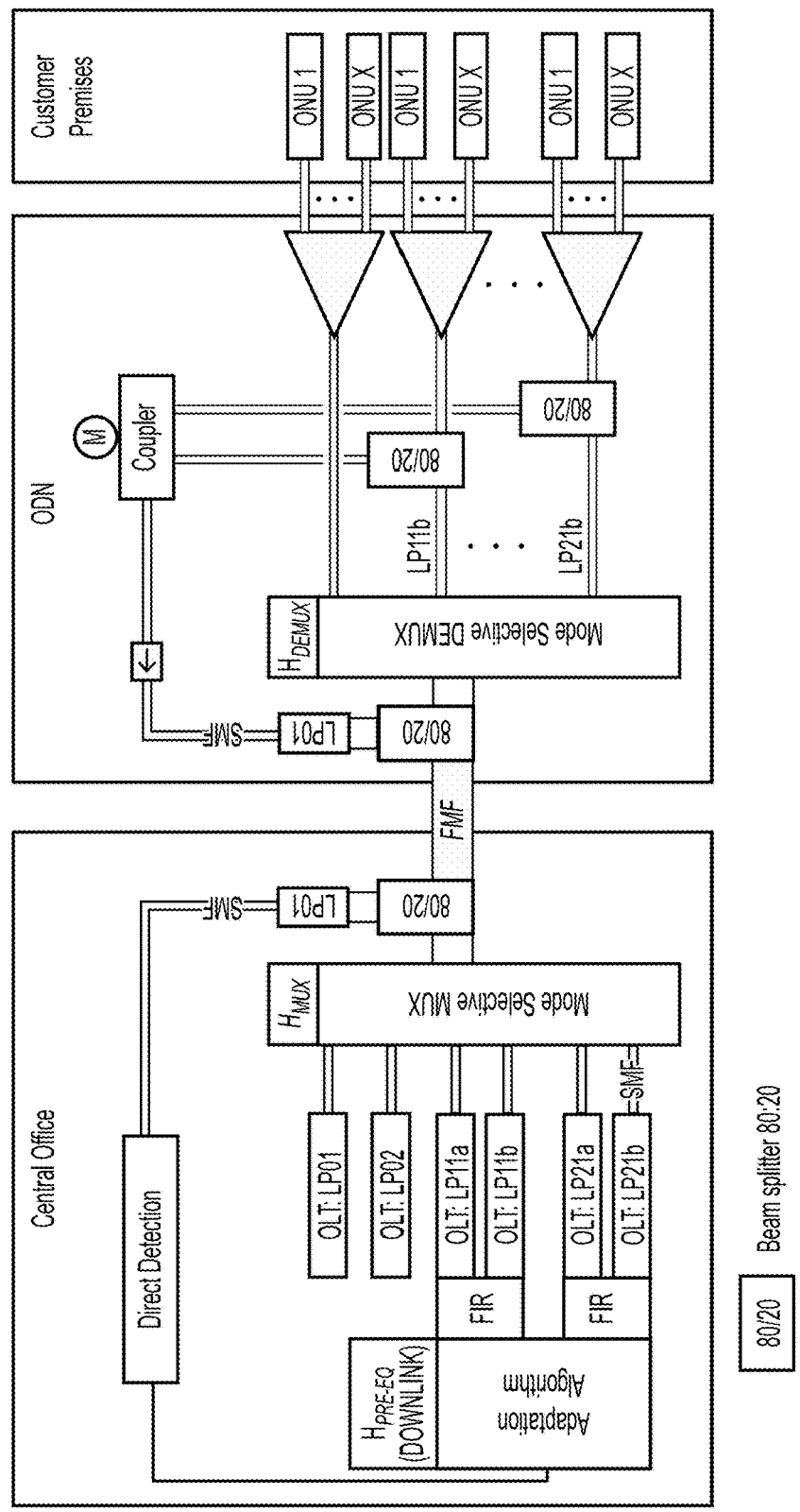
FIG. 3 is a schematic diagram of an MDM-PON downlink architecture that is an embodiment of the present invention.

FIG. 3 shows the proposed downlink architecture using mode selective MUX/DEMUXs. In this case, the crosstalk can be mitigated by compensating only for the crosstalk taking place between the degenerate modes. Furthermore, it can be shown that because the DMD between degenerate modes is usually very low (~1 ps/km), the crosstalk terms between degenerate modes show low dependency on the frequency. Thereby, the crosstalk terms can be estimated by using pilot tones (in-band and/or out-of-band).

The electrical channel estimation/inversion at the central office for the downlink is based on pilot tones (PT) that are retrieved after the mode selective DEMUX at the ODN before the optical splitters, as shown in FIG. 3. However, the signals at the mode DEMUX cannot be simply mirrored back since they would undergo through additional crosstalk along the uplink. To overcome this issue, the invention proposes the usage of quasi-single mode transmission for the retrieval of the pilot tones using one (or more) of the non-degenerate modes (LP01, LP02, LP0$x$, . . . ). In other words, the outputs from the mode DEMUX which correspond to pairs of degenerate modes are tapped (e.g. using a 80:20 beam splitter), coupled together, and transmitted back to the CO over one (or more) of the non-degenerate modes (LP01, LP02, . . . ). Note that the usage of more than one of the LP0$x$ modes allows to reduce the coupling losses (see point M in FIG. 3). For instance, for 6 modes (LP01, LP02, LP11$a$, LP11$b$, LP21$a$, LP21$b$), the pilot tones of the pair LP11$a$/LP11$b$ can be transmitted over LP01 and the pilot tones of the pair LP21$a$/LP21$b$ can be transmitted over LP02. In this way, two 2×1 couplers can be used instead of one 4×1 coupler (the losses of the coupler scale with the number of ports). For more than 6 modes, similar reasoning applies.

The channel estimation can be carried out relying on one pilot tone per pair of degenerate modes or two pilot tones with different frequencies per pair of degenerate modes. Moreover, in order to avoid the interference between pilot tones when they are coupled together after the mode DEMUX, unique frequencies can be addressed to each pair of degenerated modes.

Once the transmitted PTs are directly detected at the central office, these are used for the blind estimation of the 2×2 matrices that describe the mode coupling LP11$a$ and LP11$b$ and the mode coupling between LP21$a$ and LP21$b$. The subsequent information symbols are pre-equalized with this estimated matrices in such a way the information can be successfully recovered at the ONUs.

In order to test the configuration proposed in FIG. 3, the performance of a MDM system supporting 3 modes (LP01, LP11$a$, LP11$b$) and one 10 Gbps intensity modulated direct detected (IM/DD) system per mode, operating independently from each other, was modelled and simulated. The crosstalk introduced by the fibre was varied from −40 dB/km to −15 dB/km, and the mode MUX/DEMUX was assumed to introduce −20 dB crosstalk. The fibre was assumed to introduce a differential mode delay of 1000 ps/km between LP01 and LP11$a$/$b$ and 1 ps/km between LP11$a$ and LP11$b$. Finally, in order to assess the frequency dependency of the fibre transfer matrix coefficients, the estimation was done at 1547.5 nm and the 10 Gbps IM/DD channels where transmitted at a different wavelength that was varied from 1530 nm to 1565 nm.

Figure 4:
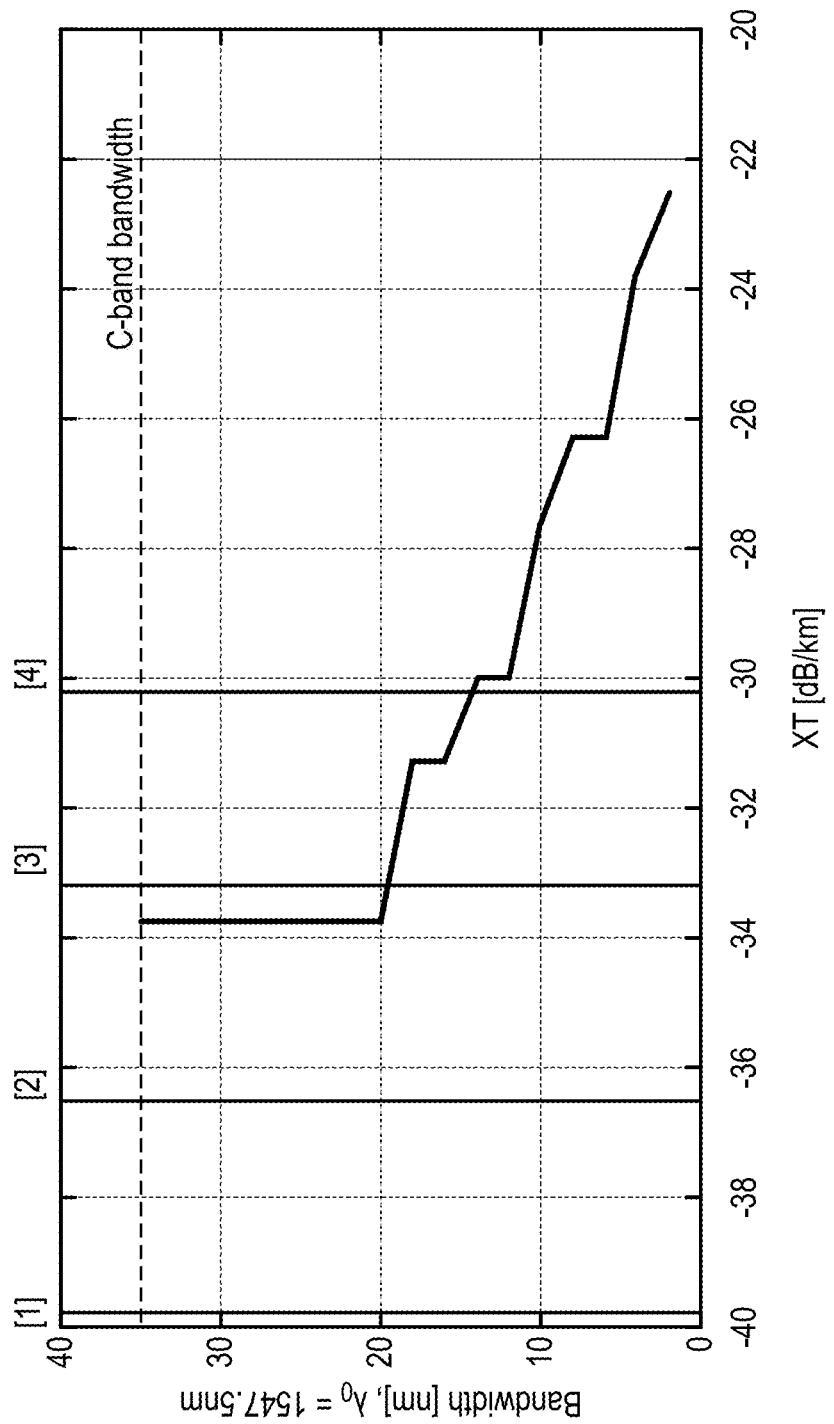
FIG. 4 is a graph showing error free bandwidth as function of crosstalk.

FIG. 4 shows the error free bandwidth as function of the FMF crosstalk. The results show that for a fibre presenting a crosstalk strength of −25 dB/km, the method proposed would be able to compensate the crosstalk between the degenerate modes over 5 nm. On the other hand, for a fibre with a crosstalk around −34 dB/km, the method proposed would be able to compensate the crosstalk between the degenerate modes over 32 nm (the whole extended C-band). Table 1 present a list of properties of several FMFs presented in the literature. It can be see that they present a crosstalk strength of between −30 and −40 dB/km. The present invention can thus be expected to enable meaningful compensation using such FMFs.

TABLE 1

Properties of known FMFs

| Fibre | XT [dB/km] | LP modes | Refractive-Index Profile | Reference |
|---|---|---|---|---|
| [1] | −39.77 | 3 | Graded-Index | L. Grüner-Nielsen, et al., J. Lightw. Technol., 30(23), p. 3693, 2012. |
| [2] | −36.53 | 3 | Step-Index | A. Li, et al., Proc. OFC'2011, p. PDPB8. |
| [3] | −33.19 | 3 | Graded-Index | R. Ryf, et al., J. Lightw. Technol., 30(4), p. 521, 2012. |
| [4] | −30.21 | 6 | Graded-Index | T. Mori, et al., Proc. OFC'2013, p. OTh3K.1. |

Figure 5:
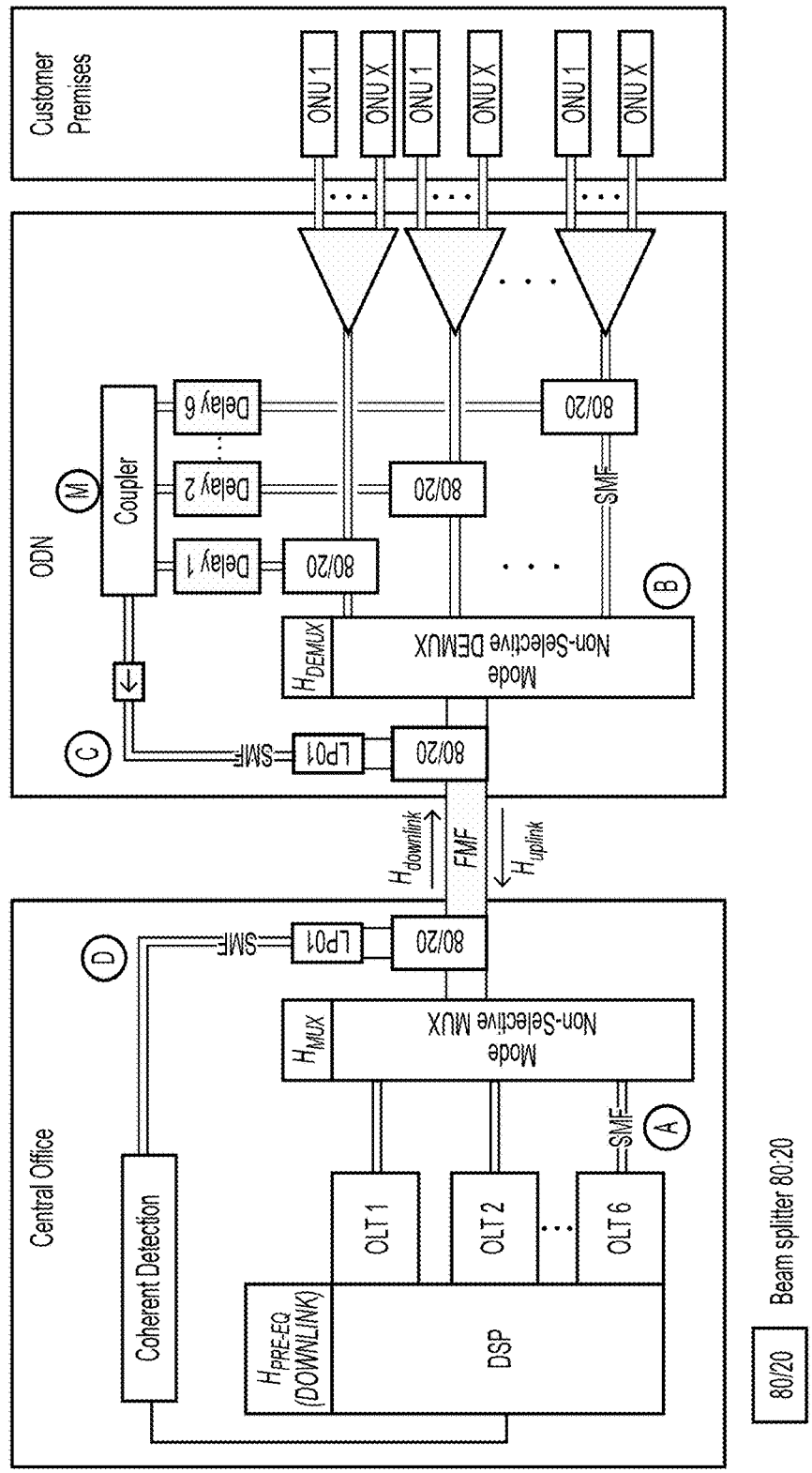
FIG. 5 is a schematic diagram of an MDM-PON downlink architecture that is another embodiment of the present invention.

FIG. 5 shows a proposed downlink architecture using mode non-selective MUX/DEMUXs. In this case, the crosstalk can only be mitigated by compensating for the full set of modes. Furthermore, because the DMD between non-degenerate modes is usually high (10-100 ps/km and higher), the channel matrix is frequency dependent. Thereby, pilot tones cannot be used. Instead it is proposed to use training sequences to perform channel estimation. Note that the architecture in FIG. 5 would be equally valid when using mode selective MUX/DEMUX. However, in that case, the usage of pilot tones is possible and the architecture in FIG. 5 could be simplified to match the architecture presented in FIG. 3, as explained above.

The electrical channel estimation/inversion at the central office for the downlink is based on training sequences that are retrieved after the mode non-selective DEMUX at the ODN before the optical splitters, as shown in FIG. 5.

Figure 6:
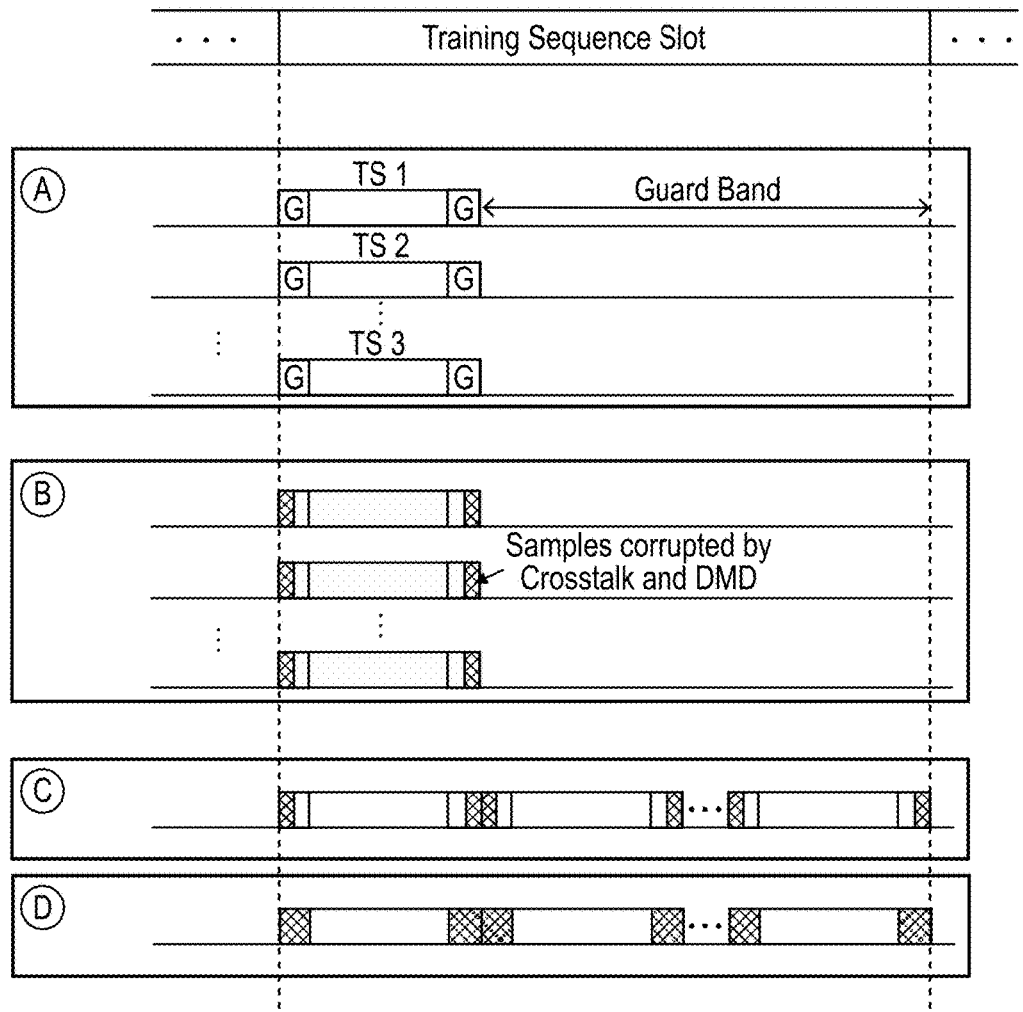
FIG. 6 is a schematic diagram of a downlink PON frame that is an idealized representation of the training sequences at different points of the proposed architecture.

After downstream propagation, the downlink signals are tapped just after the mode DEMUX (see FIG. 5) so that they can be returned to the central office and be used to estimate the crosstalk characteristic of the optical transfer unit. Similarly to FIG. 3, it is proposed to use quasi-single mode transmission for the retrieval of the training sequences (using non-degenerate modes LP01, LP02,). However, unlike the downlink reference signals, which can be sent in parallel, the uplink reference signal must send the training sequences in series if a quasi-single mode transmission is used. Thus, the tapped signals are added together to form the uplink reference signal after going through different delays. In order to be able to accommodate such delays, time guard bands are included around the training sequences. FIG. 6 shows an idealized representation of the training sequences at different points of the architecture shown in FIG. 5. Once the transmitted TS are detected in the OLT, these are processed in order to get an estimation of the multiple-input multiple-output (MIMO) matrix (a 6×6 matrix in this embodiment) which describes the downlink channel, including the mode coupling and delay from the few-mode fibre. The subsequent information symbols are pre-equalized with this estimated matrix in such a way the information can be successfully recovered at the ONUs.

When the signals propagate through the few-mode fibre, they undergo mode coupling and dispersion mode delay, whose effects must be effectively captured by the training sequences. A number of different suitable types of training sequences can be used to get an estimation of the MIMO channel matrix. In one embodiment, constant-amplitude zero-autocorrelation (CAZAC) sequences can be used. Taking advantage of their shift-orthogonality property, the length of each training sequence sample must fulfil the following:

$$T_{TS} \geq N \cdot \Delta T_{ch} + G \qquad 1$$

where $\Delta T_{ch}$ is the time broadening due to dispersion mode delay the signals undergo in the downlink direction, and G is additional time duration to accommodate corrupted signal samples due to the dispersion mode delay-induced broadening. In this way, the first term of the right hand side member of equation 1 ($N \cdot \Delta T_{ch}$) aims to get a sufficient number of signal samples for the estimation of the MIMO downlink channel, whilst the second term (G) aims to protect these samples from getting corrupted when the signals propagate in the downlink and uplink directions. Thus, the value of this additional time duration must be set taking into account that the signals have propagated through the few-mode fiber twice (one when going from point A to point B, and one more when going from point C to point D in FIG. 5). Therefore, G is given by:

$$G = 2 \Delta T_{ch} \qquad 2$$

Although a smaller value of G might be possible, it could lead to a loss of performance due to a worse channel estimation.

A conservative value for $\Delta T_{ch}$ would be given by the differential delay between the slowest and the fastest mode when propagated through the few-mode fiber:

$$\Delta T_{ch} = \tau^{slowest} - \tau^{fastest} = L \cdot \left( \frac{1}{v_g^{slowest}} - \frac{1}{v_g^{fastest}} \right) \qquad 3$$

Where $v_g^{slowest}$ and $v_g^{fastest}$ are the group velocities of the slowest and fastest modes, respectively.

The length of the guard-band in FIG. 6 can guarantee that the whole set of training sequences transmitted in all the modes fit once parallel-to-serial operation is performed. Assuming N modes are transmitted, the time duration of the guard-band is given by:

$$T_{GB} = N \cdot T_{TS} \qquad 4$$

Equation 4 can be modified to consider any deviation when delaying the different mode-demultiplexed signals in point B of FIG. 5.

Finally, the retrieval of the training sequences can be done through more than one LP0x mode. In this case, the coupling losses at point M (FIG. 5) can be reduced, as explained for the first prototype. However, in this case, using more than one LP0x mode has one more advantage, it also allows for the reduction of the time guard band. For instance, for 6 modes (LP01, LP02, LP11a, LP11b, LP21a, LP21b), the TS of the LP01, LP11a and LP11b can be transmitted back over LP01 and the TS of LP02, LP21a and LP21b can be transmitted over LP02. In this way, the $T_{GB}$ can be reduced by a factor of two. For more than 6 modes, similar reasoning applies.

In order to test the configuration proposed in FIG. 5, the performance of a MDM system supporting 3 modes (LP01, LP11a, LP11b) and one 40 Gbps QPSK system per mode is modelled and simulated. The pre-equalization at the CO is achieved using a coherent receiver to estimate the downlink transfer matrix from the training sequences being retrieved just after the mode DEMUX. Furthermore, a simple direct detection ONU (without DSP) is used. The crosstalk introduced by the fibre is varied from −50 dB/km to 0 dB/km, the mode non-selective MUX/DEMUX are considered to introduce an arbitrary high crosstalk value (full mixing), and the LP01 mode launch/select scheme is assumed to be ideal. The fibre is assumed to introduce a differential mode delay of 40 ps/km between LP01 and LP11a/b and 1 ps/km between LP11a and LP11b.

Figure 7:
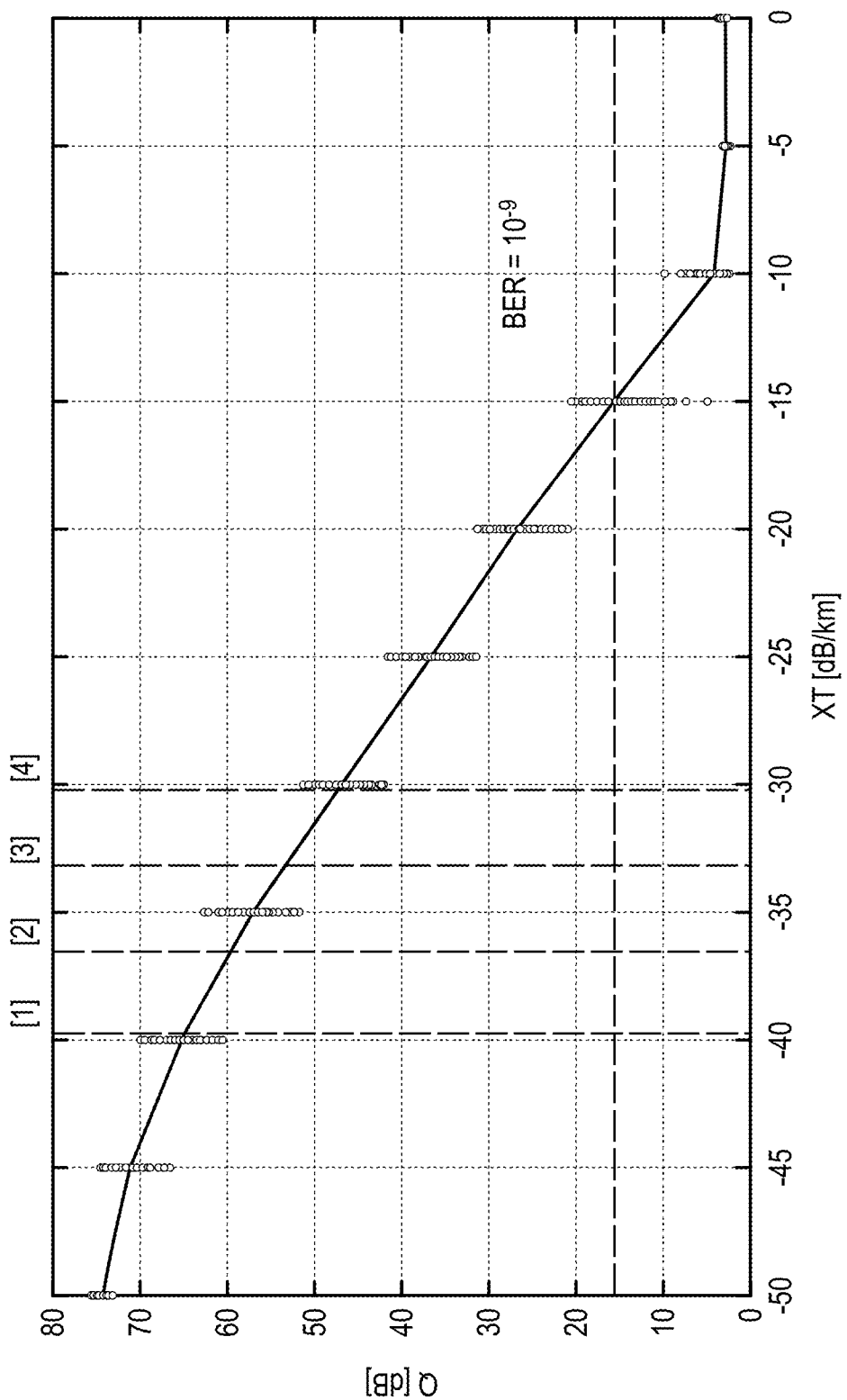
FIG. 7 is a graph illustrating performance of the MDM-PON downlink architecture shown in FIG. 5.

FIG. 7 shows the Q-factor as a function of the fibre crosstalk, where the Q-factor of the worst mode is presented. The results show that for a fibre presenting a crosstalk strength as high as −20 dB/km, the prototype proposed would be able to correctly pre-compensate the crosstalk for the full set of modes.

The implementation of the architecture presented in FIG. 3 may use an electrical feedback loop circuit to command the electrical butterfly coefficients of the FIR filters that are used to provide pre-compensation. The implementation of the architecture in FIG. 5 may use an array of optical delay lines for the parallel-to-serial conversion of the transmitted downlink training sequences.

Figure 8:
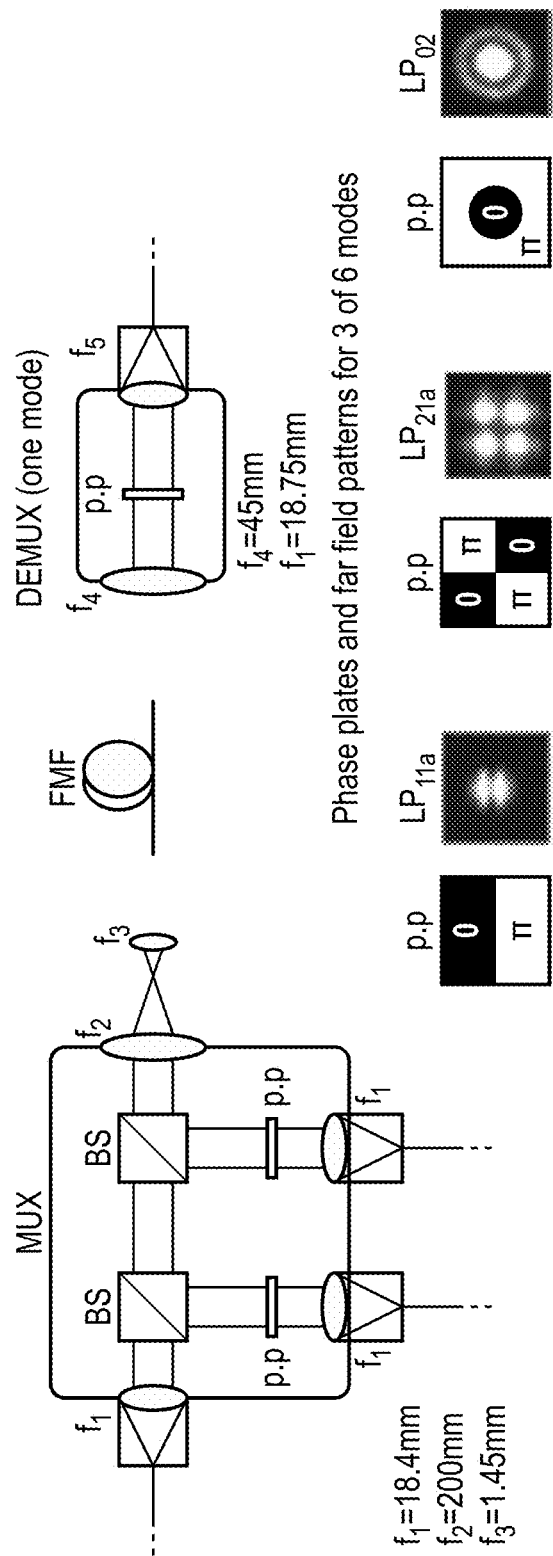
FIG. 8 is a schematic diagram showing configurations for a multiplexer and a demultiplexer suitable for use with the invention.

The mode selective MUX/DEMUX can be implemented using phase plates in a free-space optics configuration as shown in FIG. 8.

The embodiments discussed above can present several advantages. Both embodiments concentrate the signal processing effort in the central office, thereby avoiding the usage of digital signal processing in the ONUs. The embodiment that uses a mode selective MUX/DEMUX simplifies the OLT it simplifies the transmitter as only pilot tones are required, and it simplifies the receiver as only the usage of direct detection and simple electrical butterfly fir filters are required. The embodiment that uses a mode non-selective MUX/DEMUX allows the usage of lower cost optical components however it requires the usage of field detection techniques and digital signal processing.

In an embodiment that uses the mode selective MUX/DEMUX, one pilot tone can be used per each pair of degenerate modes. Moreover, each pilot tone will have a different frequency such that when they are added after the DEMUX no interference takes place. The pilot tones can be used to update the FIR filter coefficients in two ways:

Maximization the power of the retrieved/detected pilot tone is maximized when the pilot tone is launched in the ordinary mode and collected from the ordinary mode;

Minimization: the power of the retrieved/detected pilot tone is minimized when the pilot tone is launched in the ordinary mode and collected from the extraordinary mode.

The pilot tones may be low-frequency in-band tones or out-of-band high frequency tones. The pilot tones can be

The invention claimed is:

1. A mode division multiplexing passive optical network comprising:
   a plurality of input channels, each of the plurality of input channels being arranged to convey an input optical signal in a different one of a plurality of modes;
   an optical transfer unit comprising:
   a multiplexer having a plurality of input ports and an output port, wherein each of the plurality of input ports is connected to a respective one of the plurality of input channels;
   an optical fibre having an uplink end connected to the output port, wherein the optical fibre is arranged to receive from the multiplexer a mode multiplexed signal corresponding to the input optical signals from the plurality of input channels; and a demultiplexer having an input port and a plurality of output ports, wherein the input port is connected to a downlink end of the optical fibre, and wherein the demultiplexer is arranged to divide the mode multiplexed signal between each of the plurality of output ports; and a plurality of output channels, each of the plurality of output channels being connected to a respective one of the plurality of output ports and being arranged to convey an output optical signal in a different one of the plurality of modes conveyed by the plurality of input channels, wherein the optical transfer unit is arranged to:

transmit a plurality of downlink reference signals in the mode multiplexed signal, each of the plurality of downlink reference signals being in a different one of the plurality of modes, receive the plurality of downlink reference signals at the plurality of output ports, couple the received plurality of downlink reference signals into an uplink reference signal, transmit the uplink reference signal in a quasi-single mode transmission along the optical fibre, and receive the uplink reference signal at the uplink end of the optical fibre; and wherein the passive optical network further comprises a downlink signal pre-compensation module arranged to adapt the optical signals on two or more of the plurality of input channels to pre-compensate for crosstalk in the optical transfer unit, wherein the downlink signal pre-compensation module is controllable based on the received uplink reference signal.

2. The network of claim 1, wherein the multiplexer is mode-selective.

3. The network of claim 2, wherein the downlink reference signals are pilot tones transmitted on degenerate mode pairs in the plurality of modes.

4. The network of claim 2, wherein the downlink pre-compensation module comprises an electrical butterfly FIR filter on each of the two or more of the plurality of input channels.

5. The network of claim 1, wherein each downlink reference signal comprises a training sequence transmitted in a downlink training sequence time slot.

6. The network of claim 5, wherein the training sequence time slot includes a guard band having a duration long enough to encompass a uplink training sequence that comprises the received downlink reference signals in series.

7. The network of claim 1, wherein the uplink reference signal is transmitted using a non-degenerate mode in the plurality of modes.

8. The network of claim 1, wherein the optical fibre is a few mode fibre (FMF) capable of supporting propagation in a plurality of degenerate and non-generate modes.

9. A method of compensating for crosstalk in a mode division multiplexing passive optical network, the method comprising:

inputting a plurality of downlink reference signals to a multiplexer, each of the plurality of downlink reference signals being in a different one of a plurality of modes;

transmitting the plurality of downlink reference signals as a mode multiplexed signal along an optical fibre;

receiving the mode multiplexed signal at a demultiplexer;

outputting a plurality of received downlink reference signals from the demultiplexer, each of the received plurality of downlink reference signals being in a different one of a plurality of modes;

coupling the received plurality of downlink reference signals into an uplink reference signal, transmitting the uplink reference signal in a quasi-single mode transmission along the optical fibre, adapting a plurality of optical signals input to the multiplexer based on the uplink reference signal to pre-compensate for crosstalk.

* * * * *